Figure 1:
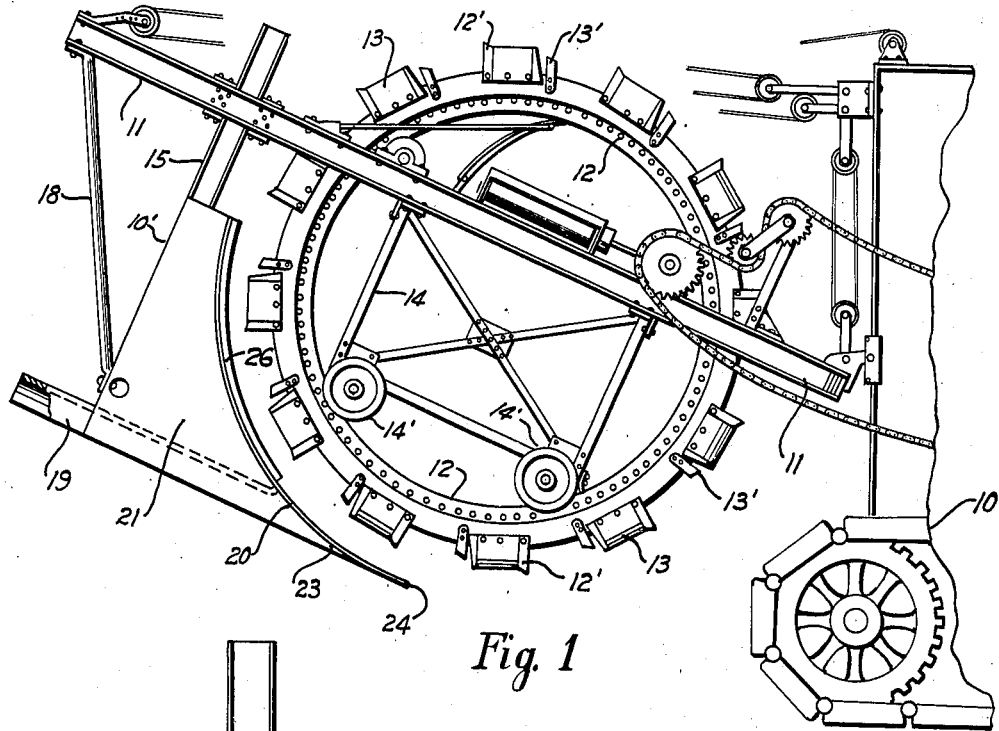

Feb. 4, 1941.    W. D. WIDNER    2,230,474
PIPE STRIPPING DEVICE
Filed Nov. 18, 1938    2 Sheets-Sheet 1

Inventor
William D. Widner
By Jack A. Ashley
Attorney

Feb. 4, 1941.  W. D. WIDNER  2,230,474
PIPE STRIPPING DEVICE
Filed Nov. 18, 1938   2 Sheets-Sheet 2

Inventor
William D. Widner
By Jack A. Schley
Attorney

Patented Feb. 4, 1941

2,230,474

UNITED STATES PATENT OFFICE 2,230,474

PIPE STRIPPING DEVICE

William D. Widner, Houston, Tex.

Application November 18, 1938, Serial No. 241,173

6 Claims. (Cl. 37—97)

This invention relates to new and useful improvements in pipe stripping devices.

In reconditioning old or damaged pipe lines, it is necessary to remove the pipe sections from the ground in order that said sections may be inspected. Most pipe lines are laid only a few feet below the surface of the ground and usually are uncovered by an excavating machine of the type known and referred to as a "trench excavator" or "traction ditcher." Excavating machines of this type generally employ a digging wheel having buckets disposed at intervals around its periphery. These machines have been used for years and have proven to be very satisfactory. However, it has been impossible to entirely uncover the pipe or to remove the dirt from around said pipe by these machines so that the same would be exposed sufficiently to permit the same to be engaged and lifted from its ditch or trench by tongs. Heretofore, manual labor has been employed to complete the uncovering of a pipe line after an excavating machine has partially uncovered the same.

Therefore, it is one object of this invention to provide improved means for removing or stripping dirt from a pipe line which has been partially uncovered by an excavating machine, whereby this operation need not be performed manually.

An important object of the invention is to provide an improved stripping device which is adapted to be mounted on an ordinary wheel-type excavating machine, which normally operates to partially uncover a pipe line, the stripping device having means for removing or stripping dirt from around each side as well as from above the partially uncovered line, whereby the greater portion of said pipe line is exposed.

Another object of the invention is to provide an improved stripping device adapted to be mounted on an excavating machine and including a supporting member which is arranged to engage and ride upon the surface of a pipe line and which is constructed so as to be rotatable with relation to the line without disengagement from said line, said member supporting the digging mechanism of the machine so as to regulate its cutting depth and also serving as a guide for such mechanism, due to its engagement with the pipe line, which acts as a guide track; the member also permitting the digging mechanism to tilt with relation to the pipe, whereby in the event that the mechanism is longitudinally misalined with the pipe, the tilting of said mechanism advises the operator of such misalinement.

A particular object of the invention is to provide an improved stripping device, having a guard member which is provided with a pair of extensions projecting beneath the digging wheel on each side of the pipe line so as to strip the dirt from each side of said pipe line, whereby the sides of the line are exposed so that suitable tongs may be readily engaged around the pipe line and the same lifted from its ditch or trench.

A further object of the invention is to provide an improved device of the character described which is so constructed that it will ride over the collars or couplings of a jointed pipe line, whereby said device may be employed to strip dirt from around the conventional types of pipe lines.

A construction designed to carry out the invention will be hereinafter described, together with other features of the invention.

Figures 2, 3, 8:
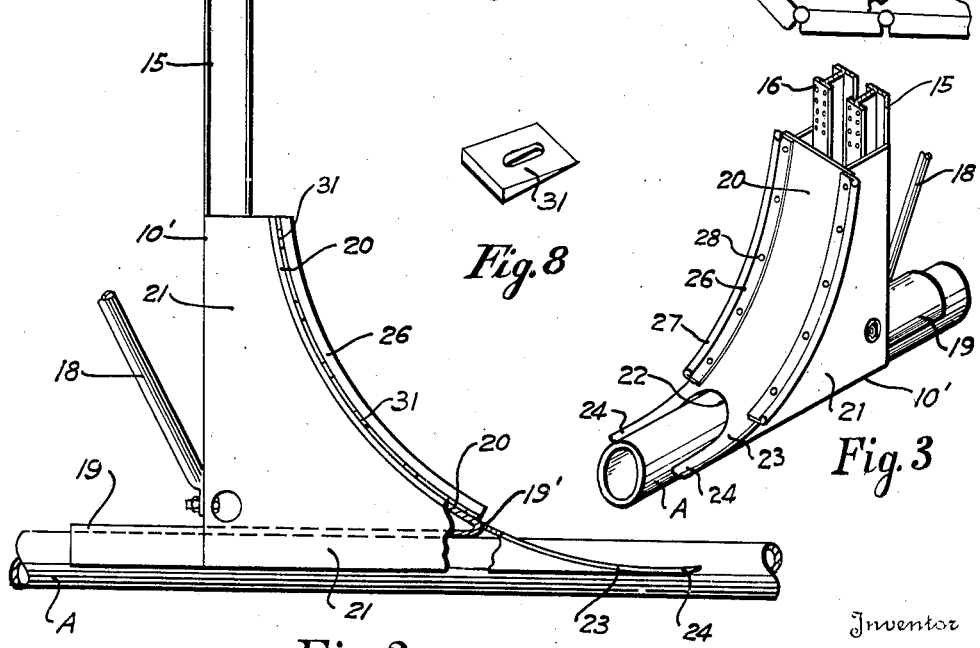
Figure 4:
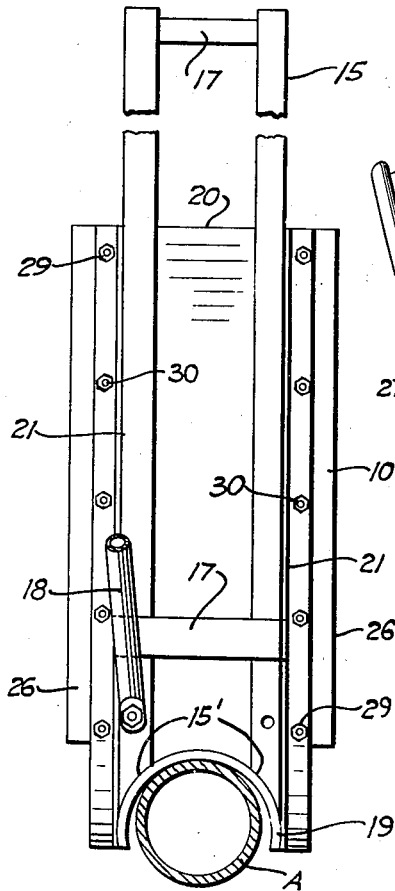
Figure 5:
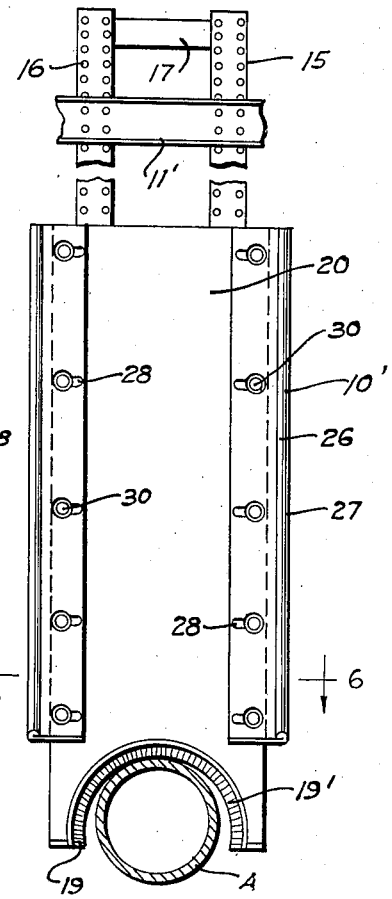
Figure 6:
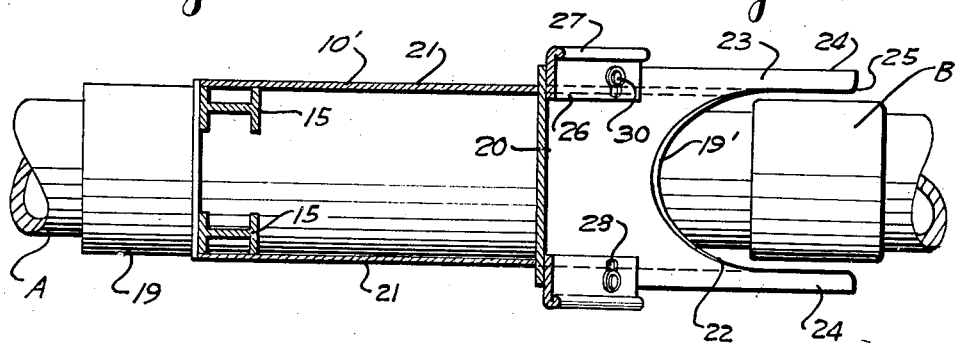

The invention will be more readily understood from a reading of the following specification and by reference to the accompanying drawings, in which an example of the invention is shown, and wherein:

Figure 1 is a side elevation of a stripping device constructed in accordance with the invention and mounted on an excavating machine, Figure 2 is an enlarged side elevation of the stripping device having its guide shoe in engagement with and resting upon a pipe, Figure 3 is a reduced isometric view of the device in the same position, Figure 4 is an enlarged rear elevation of the same, Figure 5 is an enlarged front elevation of the device, Figure 6 is a horizontal cross-sectional view taken on the line 6—6 of Figure 5, and Figure 7 is an isometric view of one of the adjustable strips of the guard member.

Figure 8 is an isometric view of one of the adjusting blocks.

In the drawings, the numeral 10 designates a portion of an excavating machine of the type known and generally referred to as a "traction ditcher" or "trench excavator" and includes the usual frame formed of spaced, longitudinal, parallel main I-beams 11 which are connected by transverse cross-bars 11' and between which is mounted an annular excavating wheel 12. A plurality of buckets 13 are disposed at regular intervals around the periphery of the wheel 12, while a plurality of center cutters 12' and side cutters 13' are secured to said wheel adjacent the buckets. The wheel is adapted to be rotated about a fixed guide frame 14 which carries guide rollers 14' by suitable driving means, such as a chain and gears, whereby a trench or ditch is dug by the buckets and cutters. All of the above parts are of the usual construction and form no part of the present invention.

A stripping device 10' is arranged to be mounted on the machine 10 immediately behind the wheel 12 and includes a pair of elongate, parallel I-beams 15 disposed between the main I-beams 11 so as to extend substantially at a right angle thereto. A plurality of small openings 16 are provided in the upper portion of each forward flange of each beam 15, whereby the upper ends of the beams may be fastened by suitable bolts to one of the transverse cross-bars 11' which connect the main beams 11. The provision of a multiplicity of openings 16 in the beams 15 makes it possible to vary the elevation or vertical position of said beams with relation to the excavator frame, as will be hereinafter explained. The beams 15 are spaced from each other by a pair of transverse cross-bars or braces 17, one at each end, which are welded or otherwise secured thereto as shown in Figure 4. For reinforcing the beams 15, a pair of trusses 18 extend at an angle from the rear or outer ends of the excavator frame to the lower ends of said beams 15 and have their ends fastened to said beams and frame by suitable bolts and nuts.

An elongate, semi-cylindrical guide shoe or runner 19 is preferably welded to the arcuately bevelled lower ends 15' of the beams 15 and the longitudinal axis of the shoe is at substantially a right angle to the beams. Since the shoe is arcuate or substantially semi-circular in cross-section, it is adapted to engage and ride upon the cylindrical exterior surface of a partially uncovered pipe A, as shown in Figure 3. The pipe A serves as a track for the shoe as the same moves therealong. The arc or radius of the inner surface of the shoe is greater than the arc or radius through which the exterior surface of the pipe couplings or collars B extend, whereby there is a sufficient clearance between said shoe and pipe to permit the same to ride over and clear said collars. The major portion of the shoe projects forwardly of the beams 15, while a portion thereof extends rearwardly of or behind said beams as shown in Figure 2. The upper portion of the extreme forward end of the shoe is turned or curved upwardly at 19' so that when the same strikes a pipe collar it will be deflected upwardly and guided over said collar.

An arcuate or curved guard member or scraping blade 20 has its lower end welded or otherwise secured to the forward end of the guide shoe, its upper end projecting upwardly and rearwardly, as shown in Figure 3. The curvature or radius of the arcuate member is such as to substantially conform to the exterior surface of the digging wheel 12, whereby the member is spaced the same distance from the wheel throughout the length of said member. A pair of reinforcing plates 21, having a general triangular shape, extend rearwardly from the member 20 and are disposed on the outer sides of the beams 15. The forward edge of each plate is curved to conform to the curvature of the rear surface of the member and said edge is welded, or otherwise secured thereto. The plates 21 are also fastened to the beams 15. A curved or semi-circular recess 22, having a width substantially equal to the external diameter of the shoe 19, is provided in the lower or forward end of the guard member at a point adjacent and immediately above the forward end of said shoe. The recess 22 is centrally disposed with relation to the longitudinal edges of the guard member and has its curved edge abutting the edge of the upwardly turned portion of the forward end 19' of the shoe 19, which edges may be welded together.

The forward or lower extremity of the guard member is curved slightly on either side of the recess 22 and extends forwardly of the shoe 19, whereby a pair of spaced, narrow projections or flanges 23 are provided in front of said shoe as shown in Figure 6. The projections 23 have their forward portions in substantially the same horizontal plane as the lower edges of the plates and shoe 21 so as to form continuations of the same. A cutting blade 24 is provided on the forward end of each projection by bevelling or sharpening the transverse or lateral edge of the same. The inner longitudinal edge of each projection is bevelled or rounded at 25 to provide a rounded inner corner on each blade 24, thereby permitting the blades to slide past or ride over the collars B of the pipe A and preventing the same from catching thereon.

When the stripping device 10' is supported upon and riding upon the pipe to be stripped as shown in Figure 2, the blades of the projections are adapted to cut or "bite" into the dirt on each side of said pipe, whereby the dirt will be removed or stripped away from each side thereof. It is pointed out that the lower edges of the stripping device extend below the longitudinal axis of the pipe being stripped, whereby said device exposes more than one-half of the same. The guide shoe 19 of the stripping device is held in engagement with the pipe A, since the weight of said device and the excavating mechanism is supported by said shoe. Therefore, the upwardly turned forward edge 19' of the shoe and the blades 24 of the member 20 will remove or strip the dirt away from the top and sides of the pipe supporting the stripping device. Thus, the heretofore necessary use of manual labor for completing the uncovering of a pipe line is entirely eliminated.

An elongate, metallic strip 26, having a bead 27 formed on the upper surface of its outer longitudinal edge, is arranged to be fastened to each longitudinal edge portion of the member 20. The strips 26 follow the curvature of the member 20 and extend substantially throughout the length of said member. It is preferable to terminate the lower ends of the strips short of the lower end of the member or at a point above the recess 22 in said member. A plurality of laterally-extending slots 28 are provided throughout the entire length of each strip (Figure 7) and the slots are spaced an equal distance apart, being complementary to a plurality of circular openings 29 formed in the member 20 adjacent its longitudinal edges, whereby the strips 26 may be fastened to said member by means of suitable bolts and nuts 30 as shown in Figures 4 and 5. It is pointed out that the slots 28 are provided so that the strips 26 may be adjusted to conform with the width of the ditch cut by the buckets and cutters of the digging wheel 12, whereby loose dirt and sand will be retained by the member 20. If desired, a plurality of triangular wedges or blocks 31 may be inserted between the strips and the guard member so as to raise or elevate the outer edges of said strips. Thus the strips will be tilted or inclined outwardly and upwardly, whereby said strips will direct dirt inwardly toward the center of the member 20 where it may be readily scooped up by the buckets 13 of the wheel 12.

In the operation, the excavating machine 10 with the stripping device 10' mounted in the position shown in Figure 1 is alined with the stakes which indicate the buried pipe line to be uncovered. The forward end of the excavator frame formed by the I-beams 11, being slidably and pivotally attached to the machine, is lowered so that the buckets and center cutters of the wheel will engage the ground. The lowering of the forward end of the frame will raise the rear end thereof and will, of course, elevate the stripping device so that the cutting blades 24 of its guard member 20 will be higher than the lowest bucket and will not engage the ground. The digging wheel is then rotated by its driving means and is gradually lowered by dropping the forward end of the frame still lower, whereby the buckets and center cutters of said wheel will commence to cut a ditch in the ground. When the buckets have reached the approximate depth of the pipe line, the excavating machine is thrown into gear to advance the same forwardly, whereby the action of the wheel and said buckets is a progressive one along the line of the buried pipe.

After a short ditch has been dug, the rear or outer end of the frame is lowered so that the stripping device 10' will rest upon the bottom of said ditch above the pipe line. Obviously, the pivotal and slidable connection of the frame to the excavating machine will permit the forward end of said frame to move upwardly when the rear end is lowered, whereby the guide shoe 19 of the stripping device will be substantially parallel to the bottom of the ditch. As the progressive ditching operation is continued, the blades 24 of the member 20 will engage and cut away the dirt on either side of the pipe A, and the up-turned edge 19' of the shoe 19 will remove the dirt from above the pipe. Since the weight of the stripping device and the excavating mechanism is supported by the shoe 19, it will not take long for said shoe to be in snug engagement with the pipe A as shown in Figure 3. As hereinbefore set forth, the radius of the guide shoe, the rounded inner edges 25 of the cutting blades 24 and the upwardly turned edge 19' of said shoe will permit said shoe to readily slide over and past the collars B of the pipe A.

It is pointed out that the stripping device will remove dirt from each side and from above the pipe so that more than one-half of the same will be exposed. Also, it is noted that the shoe 19 not only regulates the cutting depth of the digging wheel, but also serves as a guide for the operator of the excavating machine. When the machine is out of alinement with the pipe line, one edge of the shoe will commence to ride upwardly on the pipe which will cause the stripping device, digging wheel and excavator frame to lean slightly toward one side of the ditch. As soon as the machine is re-alined with the pipe, the shoe will again snugly engage said pipe and will support the above-mentioned elements in a vertical position. Although the stripping device has been shown and described as mounted behind the digging wheel of an excavating machine, it is obvious that said device might be differently mounted or might be used independently of an excavating machine.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patents, is:

1. A pipe uncovering and stripping device of the type wherein a supporting frame is provided with means for connecting to a pulling machine and having a digging wheel mounted therein, the improvement which includes, an upright support carried by the frame in rear of the digging wheel, an elongated transversely curved guide runner adapted to ride on the stripped pipe and extending under the support, an upwardly curved scraping blade connected with the forward end of the runner and having its forward end extending beyond said runner and recessed to straddle and scrape the pipe, and means for rigidly connecting the scraping blade to the upright support.

2. A pipe stripping device including, a support arranged to be moved longitudinally along a pipe line, an elongated guide means carried by the support and extending laterally from said support for engaging and riding upon the exterior surface of the pipe line, side plates for enclosing the sides of said support, and a curved scraping blade attached to the guide means and side plates, said blade having a semi-circular recess in its lower end for receiving the upper portion of the pipe line, whereby the blade acts to strip the dirt from said upper portion of the line as the support and blade are moved therealong.

3. A pipe stripping device including, a support arranged to be moved longitudinally along a pipe line, an elongated guide means carried by the support and extending laterally from said support for engaging and riding upon the exterior surface of the pipe line, side plates for enclosing the sides of said support, a curved scraping blade attached to the guide means and side plates, and adjustable side plates mounted on the scraping blade so that the width of said scraping blade may be varied.

4. A pipe stripping device including, a support arranged to be moved longitudinally along a pipe line, an elongated guide means carried by the support and extending laterally from said support for engaging and riding upon the exterior surface of the pipe line, side plates for enclosing the sides of said support, a curved scraping blade attached to the guide means and side plates, said blade having a semi-circular recess in its lower end for receiving the upper portion of the pipe line, whereby the blade acts to strip the dirt from said upper portion of the line as the support and blade are moved therealong, and adjustable side plates mounted on the scraping blade so that the width of said scraping blade may be varied.

5. A pipe stripping device including, a support arranged to be moved longitudinally along a pipe line, an elongated guide means carried by the support and extending laterally from said support for engaging and riding upon the exterior surface of the pipe line, side plates for enclosing the sides of said support, a curved scraping blade attached to the guide means and side plates, adjustable side plates mounted on the scraping blade so that the width of said scraping blade may be varied, and means for inclining the adjustable plates so that they converge toward the center of the scraping blade.

6. A pipe stripping device including, a support arranged to be moved longitudinally along a pipe line, an elongated guide means carried by the support and extending laterally from said support for engaging and riding upon the exterior surface of the pipe line, side plates for enclosing the sides of said support, a curved scraping blade attached to the guide means and side plates, said blade having a semi-circular recess in its lower end for receiving the upper portion of the pipe line, whereby the blade acts to strip the dirt from said upper portion of the line as the support and blade are moved therealong, adjustable side plates mounted on the scraping blade so that the width of said scraping blade may be varied, and means for inclining the adjustable plates so that they converge toward the center of the scraping blade.

WILLIAM D. WIDNER.